(12) United States Patent
LaRocque

(10) Patent No.: US 7,975,449 B2
(45) Date of Patent: Jul. 12, 2011

(54) SYSTEM, ARTICLE AND METHOD FOR PREPPING/FLATTENING A FLOOR

(76) Inventor: Kyle C. LaRocque, Ortonville, MI (US)

(*) Notice: Subject to any disclaimer, the term of this patent is extended or adjusted under 35 U.S.C. 154(b) by 296 days.

(21) Appl. No.: 12/250,232

(22) Filed: Oct. 13, 2008

(65) Prior Publication Data
US 2010/0088999 A1    Apr. 15, 2010

(51) Int. Cl.
E02D 37/00    (2006.01)
(52) U.S. Cl. ................................ 52/514; 52/745.21
(58) Field of Classification Search ................. 52/514, 52/741.3, 746.1, 741.4, 745.21
See application file for complete search history.

(56) References Cited

U.S. PATENT DOCUMENTS

| 4,620,407 | A | * | 11/1986 | Schmid | 52/745.09 |
| 5,925,204 | A | * | 7/1999 | Hoffmann, Sr. | 156/98 |
| 6,159,575 | A | | 12/2000 | Rathsack et al. | |
| 6,370,831 | B1 | | 4/2002 | Marshall et al. | |
| 6,578,439 | B2 | | 6/2003 | Knothe | |
| 6,854,235 | B2 | | 2/2005 | Martensson et al. | |
| 7,241,819 | B2 | * | 7/2007 | Bowe et al. | 524/5 |
| 7,310,916 | B2 | | 12/2007 | Gorman | |
| 2005/0257880 | A1 | | 11/2005 | Herring et al. | |
| 2007/0294963 | A1 | | 12/2007 | Doerscher | |

OTHER PUBLICATIONS

Ortho Books, "Ortho's All About Tiling Basics,", Meredith Publishing Group, Copyright 2001, p. 37.*

* cited by examiner

Primary Examiner — Brian E Glessner
Assistant Examiner — Gisele Ford
(74) Attorney, Agent, or Firm — Gifford, Krass, Sprinkle, Anderson & Citkowski, P.C.

(57) ABSTRACT

An article, system and method for flattening a three dimensional depression within a substrate floor. A straight edge is applied in a progressive X and Y grid fashion across the depression, with varying levels of shims defining contact locations, thereby establishing a floor template identifying common depths of depression at overlapping perimeter defined boundaries. One or more thermo-polymer sheets is resized to define an outer perimeter matching that of a perimeter boundary. A subset thickness of the sheet is incised around its outer perimeter to establish a feathering effect upon the sheet prior to it overlaying the boundary perimeter and prior to sizing and application of additional overlapping sheets up to an outermost boundary corresponding to a shallowest depression.

16 Claims, 6 Drawing Sheets

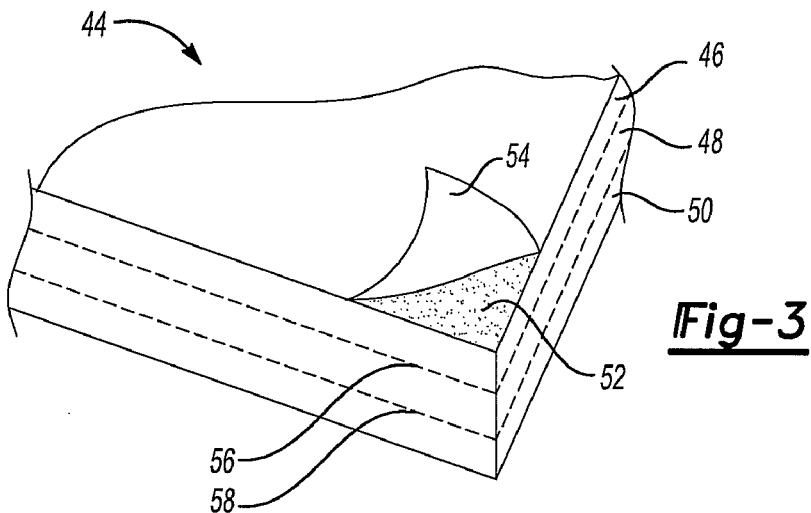
*Fig-3*
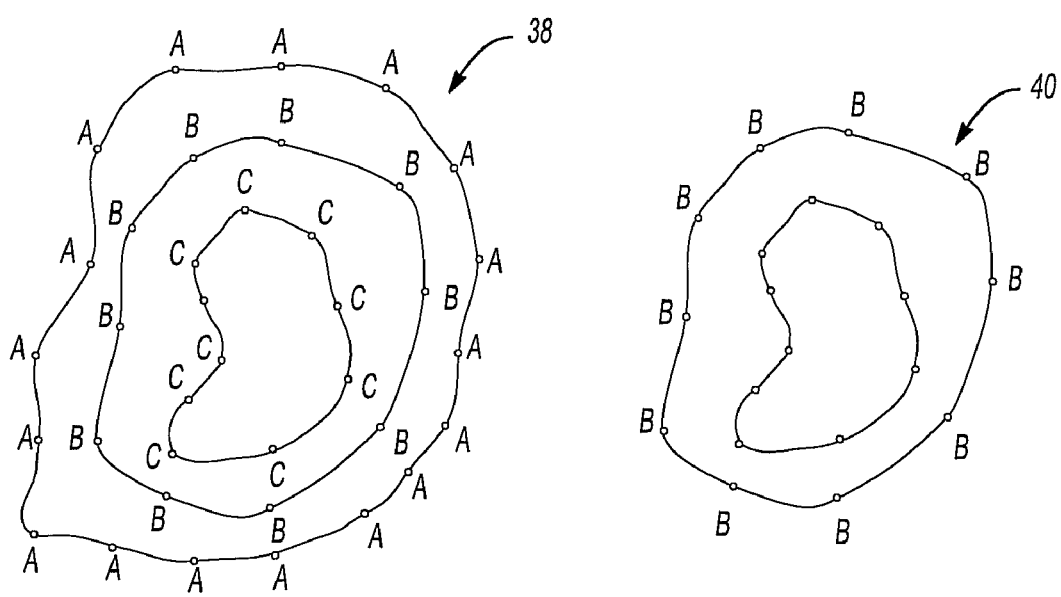
*Fig-4A*   *Fig-4B*
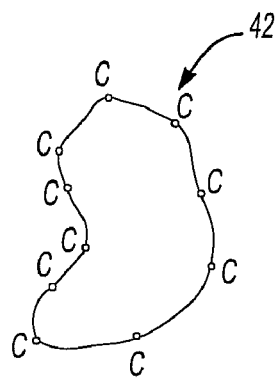
*Fig-4C*

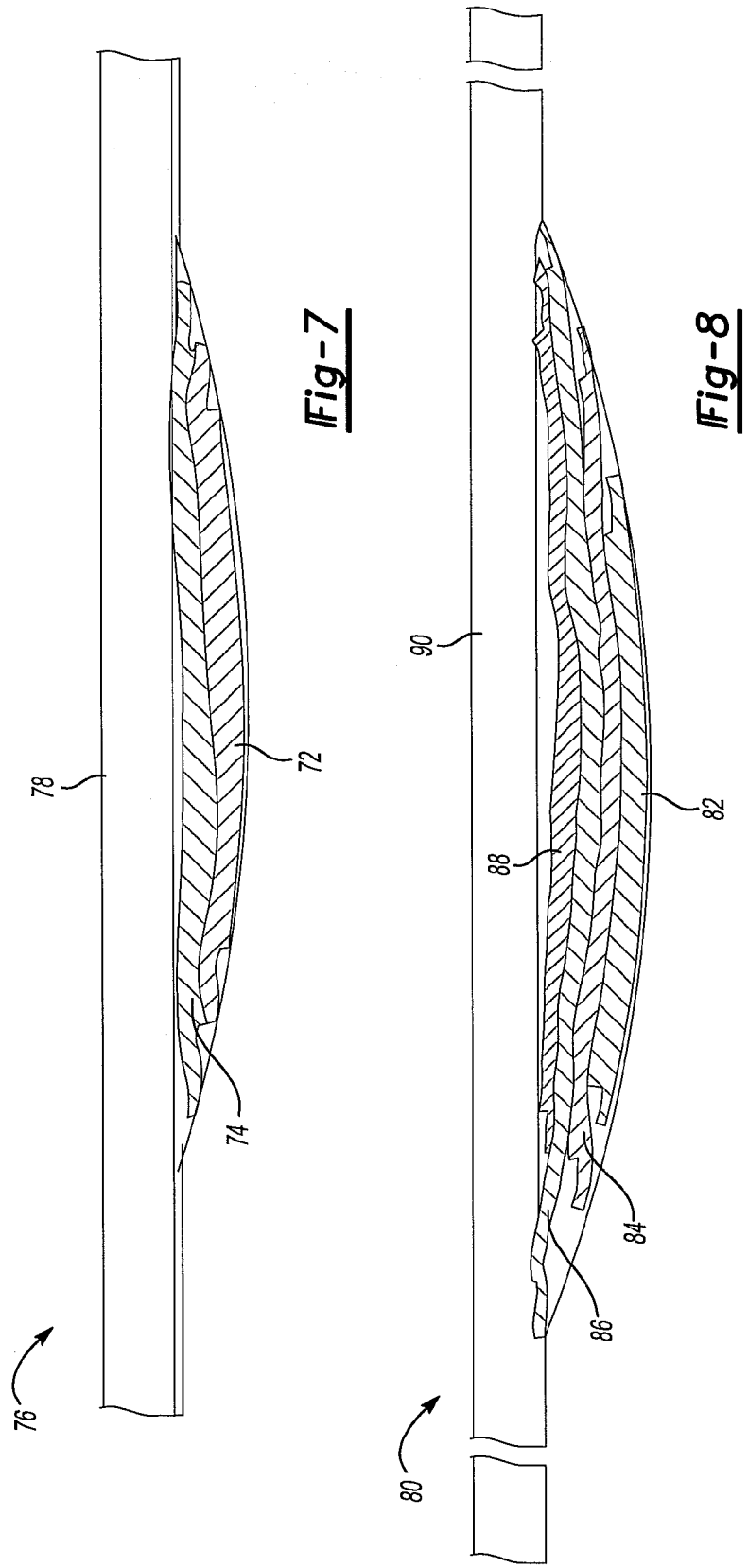

SYSTEM, ARTICLE AND METHOD FOR PREPPING/FLATTENING A FLOOR

FIELD OF THE INVENTION

The present invention discloses a system, article and method for flattening depressions in a base surface, including wood and concrete, and prior to the application of a floor overlay.

BACKGROUND OF THE INVENTION

The prior art is documented with techniques for flattening or leveling a base surface, such as a wooden subflooring or poured concrete foundation, and prior to the installation of a floor covering, such as a wood, carpet or laminate style material including but not limited to vinyl. In one known prior art application, asphalt roofing shingles has been used for "filling" in such depressions. Other "fill-in" compositions are known for use in filling a depression in a floor construction, one example of which being disclosed in U.S. Pat. No. 7,241,819 to Bowe.

SUMMARY OF THE INVENTION

The present invention discloses an article, system and method of application for flattening a regional floor depression within concrete or other material substrate flooring. A plurality of planar sheets and associated shims are provided, with a selected uncut sheet (or other elongated straight edge) being employed in a progressive X and Y grid applied fashion with varying levels of shims defining contact locations and for quickly establishing a floor template identifying common depths of depression existing within regional floor depression.

Each plurality of commonly marked depths establishes a perimeter defined boundary, with the deepest boundary typically being central most located. Progressively shallower depths define additional encircling boundaries, so that the shallow-most depth defines the outer perimeter of the floor depression.

At this point, each of the sheets is trimmed to define an outer perimeter roughly matching that of a selected perimeter extending boundary. A subset thickness ranging from such as 0.25 to 0.50 of the thickness of the sheet (for example 1/16" of a 1/8" thick sheet) is then removed around its outer perimeter, such as to a band width from between 2½-4 inches, by a box cutter or other suitable knife edge, and in order to establish a feathering effect upon the sheet overlaying its associated boundary perimeter.

To assist in the sectioning/feathering of the individual sheets of material to arrive at their subset defined thicknesses can include manufacturing the sheet from multiple ply materials, such as which are held together by an adhesive or other suitable agent. Upon being incised, removal of the desired outer band of material can be assisted by the application of a wax release agent, or the like, between the substrate layers.

An adhesive tacky layer can also be applied to an exposed surface of the sheet (this facing downwardly when applied over its corresponding recessed boundary), and with a peel away release layer exposing the tacky adhesive. Either or both of a mold inhibitor or a moisture impervious layer can also be entrained within the thermo-polymer construction of the sheets (this particularly useful in below grade basement applications).

Specified applications of the sheets (again typically below grade) can further require that they exhibit substantially waterproof performance, this particularly desirous when providing a substrate application to wood flooring. The sheets can also be constructed from other materials, such as a vinyl, when in use with concrete floors.

BRIEF DESCRIPTION OF THE DRAWINGS

Reference will now be made to the attached drawings, when read in combination with the following detailed description, wherein like reference numerals refer to like parts throughout the several views and in which:

FIG. 3 is an enlarged partial edge perspective of a thermo-polymer sheet according to one embodiment of the inventions and exhibiting such features as a subset thickness defined plies and a tacky adhesive layer revealed by a release wax layer;

FIGS. 4A-4C illustrate additional examples of boundary defined patterns, similar to that shown in FIG. 2, and which can each exhibit a differing number of individual boundary defined depths;

FIG. 7 is a level edge environmental view of a dual layer application such as shown in FIG. 6, and over which a finishing flooring is applied;

FIG. 8 is a level edge environmental view of a four layer application of a template and sheet overlay design according to a further possible variant of the present inventions.

DETAILED DESCRIPTION OF THE PREFERRED EMBODIMENTS

Figure 1:
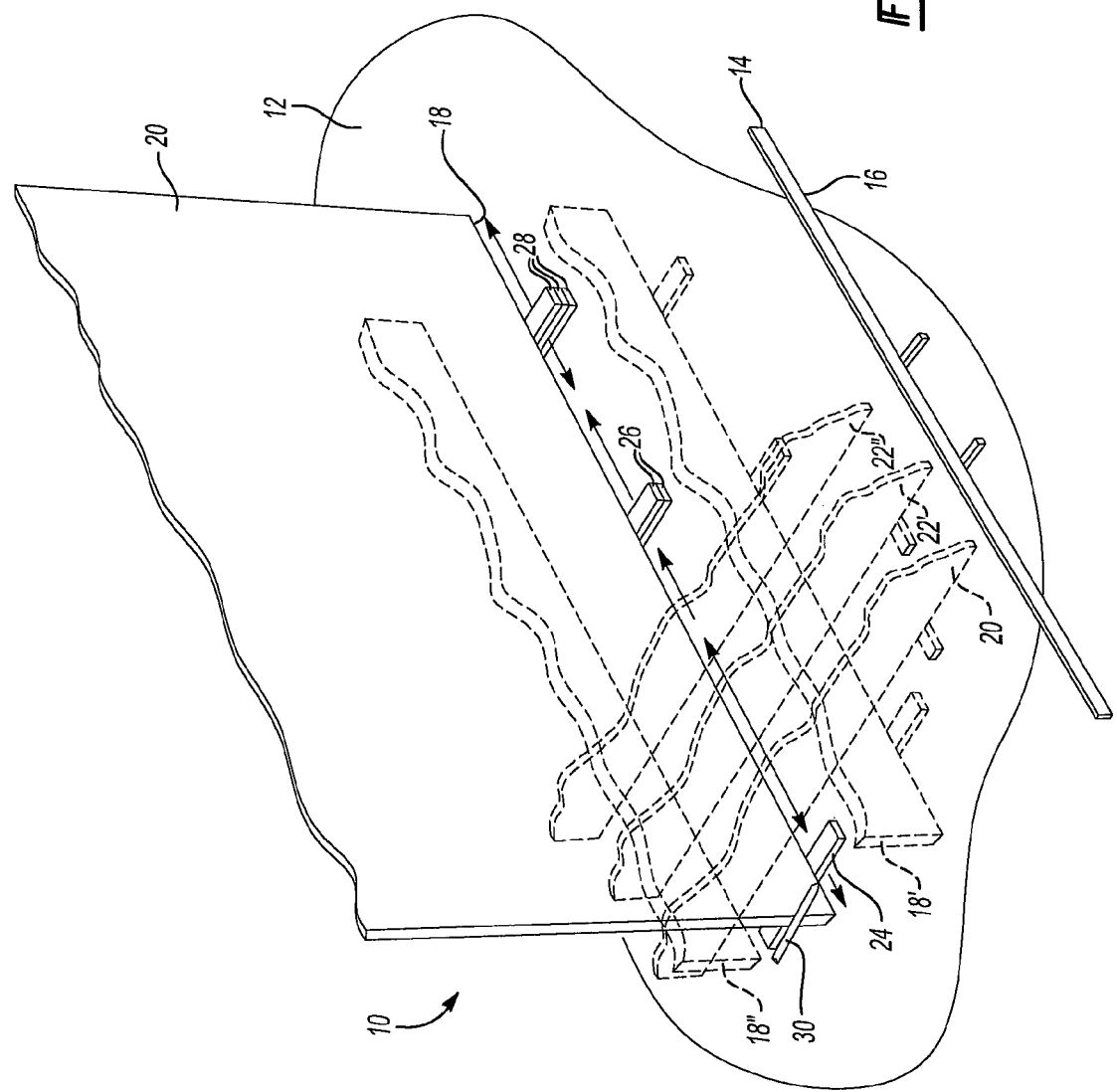
FIG. 1 is an environmental illustration of a selected level edge being applied in a progressive and iterative xy grid fashion over a recessed area and, in combination with varying pluralities of shims slidably displaced along a bottom edge of the straight edge to contacting locations with the recessed area, establishing boundary patterns corresponding to varying depth levels existing within the recessed area.

Referring now to FIG. 1 is an environmental illustration is shown at 10 of a system, method of application and sheet article for flattening a three dimensional depression existing within a floor surface. As previously described, the present invention discloses a novel system, method and article for quickly establishing individual pluralities of depth markings, these being interconnected to defining overlapping perimeter boundaries corresponding to various depth levels within the regionalized depression.

Additional features include the provision of a straight edge guide which, in combination with a plurality of shims, are manipulated in a succeeding xy grid applied fashion, and in order to establish the varying depth levels of the perimeter boundaries. A plurality of individual sheets, each exhibiting a multi-ply construction, are individually resized to correspond to each of the overlapping and indicia marked perimeter boundaries.

A perimeter extending band of material is further incised from one or more of the ply layers, this in order to provide a stepped/feathering effect when placed within the depression. The floor flattening system/method/article provides an improvement over prior techniques, and in order to establish a flattened substrate over which is applied a finish flooring, such as a wood, vinyl or ceramic/stone/marble material.

Referring again to FIG. 1, an elongated article exhibits a straight edge and which is adapted to overlay a floor depression, see as representatively shown at 12, in each of a plurality of incrementally spaced (xy grid) locations. The elongated article is, in one variant, is a ruler-type device (see as shown at 14 in FIG. 1), such as a level of up to 8' in running length, and exhibiting a downwardly facing straight edge (see as further shown at 16). The straight edge can also be established by an underside edge 18 of a sheet 20 of material, and such as which is incorporated as an overlay article as subsequently described.

The straight edge guide 14 (or selected planar sheet 18) is employed in a progressive X and Y grid applied fashion (see additional parallel spaced locations 18' and 18" as well as crosswise spaced apart locations 22, 22' and 22"). The straight edge guide is typically advanced in incrementing fashion a foot (1') for each xy spaced interval (see as best shown in the boundary template construction of FIG. 2).

Varying plurality of shims are provided, see at 24, 26, 28, et seq., each further having a length, width and thickness. The present invention includes any number of shims (such as a single shim or two, three or more stacked shims) placed between the straight edge and a location along the floor depression (see as shown in FIG. 1). The shims are slided to locations in which its/their uppermost location contacts the downwardly facing surface of the straight, edge, with its/their lowermost location contacting the floor surface. In this fashion, the individual plurality of shims each define contact locations for quickly establishing a floor template identifying common depths of depression existing within regional floor depression.

A marking indicia, such as a pencil 30 as shown in FIG. 1, is provided and is employed to mark each contact location established a single/pair/multi-stacked arrangement of shims. As again shown in FIG. 2, each plurality of commonly marked depths establishes a perimeter defined boundary, with a deepest boundary 32 typically being central most located. Progressively shallower depths define additional encircling boundaries, see at 34 and 36, so that the shallow-most depth defines the outer perimeter of the floor depression.

Figure 2:
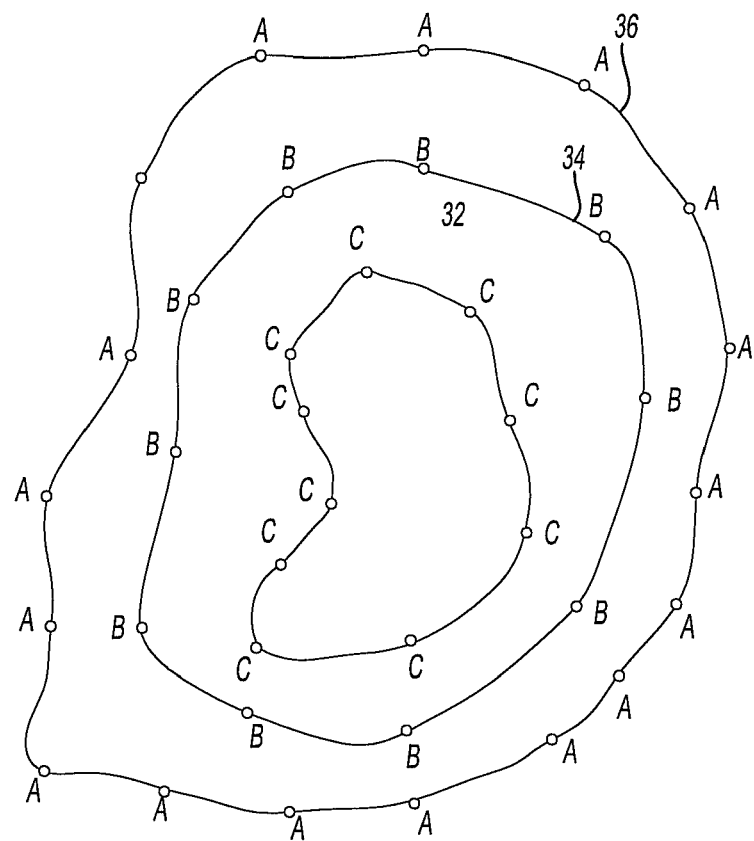
FIG. 2 is an exemplary illustration of a boundary template constructed according to the description of FIG. 1.

As further shown in FIG. 2, the marking indicia 30 (FIG. 1) is employed for identifying locations upon the floor surface in which equal numbers of shims (A=1, B=2 or C=3) is/are in contact with both an underside of said straight edge and the floor surface. The marking indicia interconnects the individual pluralities of marked locations, each of which corresponds to an equal number of shims, and in order to establish each of the perimeter defined boundaries 32, 34 and 36. Referring to FIGS. 4A-4C, illustrated at 38, 40 and 42, respectively, are additional examples of boundary defined patterns, similar to that shown in FIG. 2, and which can each exhibit a differing number of individual boundary defined depths.

Referring now to FIG. 37 an enlarged partial edge perspective is generally referenced at 44 of a thermo-polymer sheet according to one embodiment of the present invention, (it being understood that a suitable sheet exhibiting any possible material content can also be employed) and exhibiting such features as subset thickness defined as individual plies of material 46, 48 and 50, as well as an exposed face defined tacky adhesive layer 52, this revealed by an optional release plastic or wax-like layer 54. As will be further described, the tacky layer 52 provides an adhering surface for securing the sheet upon an established perimeter boundary. It is also envisioned and understood that the shims can each likewise exhibit a tacky surface layer, such as which will facilitate multiple stacking of shims when applying in the fashion shown at 26 and 28 in FIG. 1. The multi-ply sheet 44 of FIG. 3 is also understood as being the same as shown at 20 in FIG. 1 and, in one preferred variant, is provided as 42×42" (or greater such as up 8') in dimension, with an overall thickness of ⅛".

The sheet can include either a pair of plies (or three as shown in FIG. 3), such as each exhibiting a subset thickness of ¹⁄₁₆" (as in the instance of a two ply sheet) or as little as ¼ to ½ of a ¼" thick sheet. One or more intermediate boundary layers, see as shown at 56 and 58, can further includes a wax release layer to facilitate subsequent incising and removal of a selected subset ply (as will be discussed). The sheets of material (including their respective plies) can further be treated with such as moisture impervious and/or mold inhibiting material, depending upon the eventual application of the sheeting in the flattening application. It is further understood that the thermo-polymer sheet construction (such as which is employed in an elevated or above grade wood or ceramic flooring application) can be substituted in one potential application by a vinyl material and multi-ply sheeting which is utilized in a below grade application, such as upon a basement concrete surface.

Figure 5:
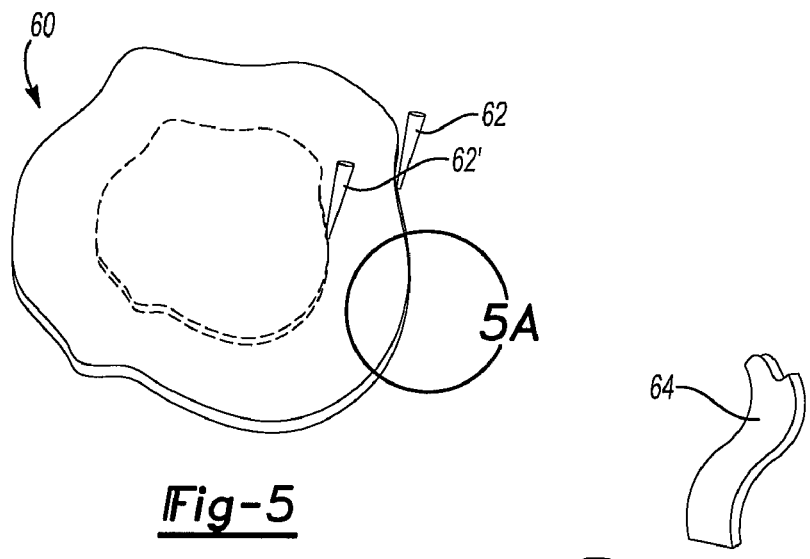
FIG. 5 is an illustration of the succeeding steps of a given sheet being trimmed to define an outer perimeter roughly matching that of a selected perimeter extending boundary, following which a subset thickness of the sheet is removed around its outer perimeter in order to establish a feathering effect (i.e. a transitional boundary) and upon the sheet overlaying its associated boundary perimeter.

Referring now to FIG. 5, an illustration is shown at 60 of the succeeding steps of a given sheet being trimmed to define an outer perimeter roughly matching that of a selected perimeter extending boundary, such as shown by any of interconnected boundaries 32, 34 and 36 in FIG. 2 or any of the individual single, double overlapping, or triple overlapping shim patterns successively illustrated in FIGS. 4A-4C. In a first resizing step, an incising tool, see knife 62, is employed to cut/resize the outer perimeter of the sheet to generally match the boundary defined perimeter over which the sheet will be subsequently applied in a flattening operation. In this first incising operation, all plies of sheet material are removed about its outer periphery, and in order that the sheets two dimensional imprint matches the boundary pattern. One technique for achieving a correct dimensioning is in applying an including or chalk indicia upon the boundary layer, over which the as yet un-sectioned sheet is placed, and in order to define a marking template on an adhering surface of the sheet to assist in subsequent knife edge (e.g. box cutter or the like) resizing.

Figure 5A:
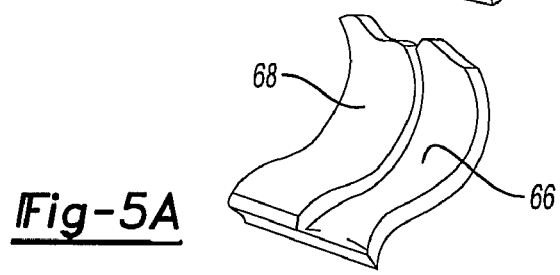
FIG. 5A is an enlarged partial illustration of the area designated at 5A in FIG. 5 and further showing the stepped configuration defined by the feathered (transitional) perimeter edge.

Following the first incising operation, the knife edge is employed in a second, subsequent operation (see at 62') and by which a subset thickness of the sheet (such as one or more of its subset thickness defined plies) is removed, such as a band of material around its outer perimeter, in order to establish a feathering effect (i.e. a transitional boundary) upon the sheet overlaying its associated boundary perimeter. A preferred width of the removed bond of material may measure in a range of 1"-6" depending upon whether employed in a corner, wall, or mid-floor application. Shown in FIG. 5A is an enlarged partial illustration of the area designated at 5A in FIG. 5, and further showing the stepped configuration defined by the feathered (transitional) perimeter edge created by sectioning an outer edge band portion, see at 64, from the outer perimeter of the sheet material, and so that a stepped pattern is established by a perimeter most extending substrate layer 66 and a previously conjoined portion 68 of an upper layer from which the outer edge band portion 64 is removed.

Figure 6:
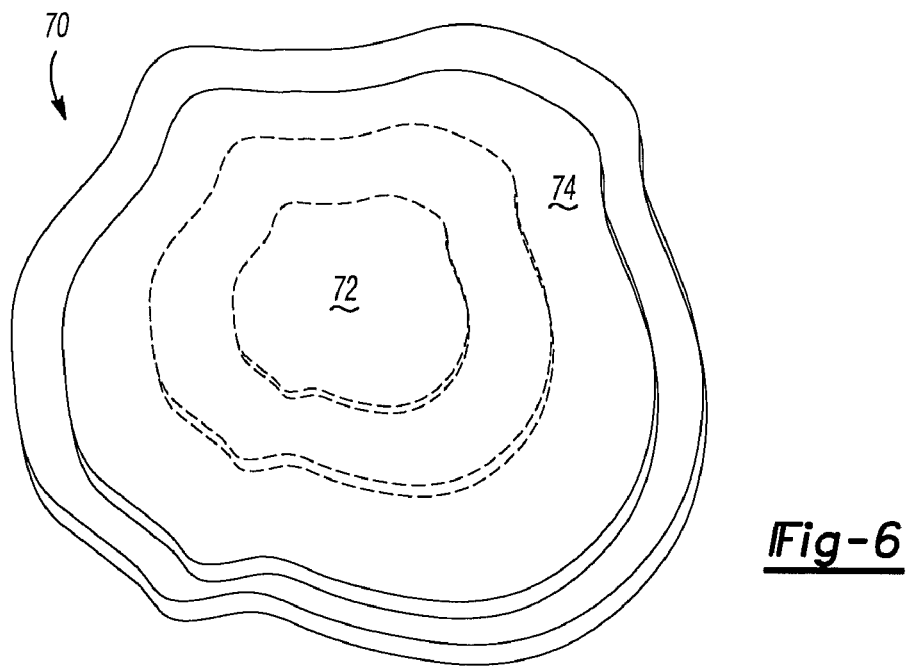
FIG. 6 is an exemplary illustration of a double boundary application (such as also designated by the template design of FIG. 4B) and by which a pair of perimeter boundary resized and edge feathered sheets are applied to roughly fill in the area defined depression.

Referring to FIG. 6, an exemplary illustration is provided at 70 of a double boundary application (such as also designated by the template design of FIG. 4B) and by which a pair of perimeter boundary resized and edge feathered sheets, see at 72 and 74, are applied to roughly fill in the area defined depression. FIG. 7 illustrates at 76 a level edge environmental view of a dual layer application, such as shown at 72 and 74 in FIG. 6, and over which a finishing flooring 78 (again including any of a wood, vinyl, ceramic or other type material) is applied. FIG. 8 is a succeeding level edge environmental view, see at 80 of a four layer (see at 82, 84, and 86) overlay sheet construction according to a yet further potential application and for preparing/flattening a substrate for eventual application of a finish flooring 90. The illustrations of FIGS. 7 and 8 further indicate that the outwardly stepped/feathering of the perimeter defined edges can be exhibited so as to face downwardly (FIG. 7) or upwardly (FIG. 8) in either of a consistently applied fashion.

Figure 9:
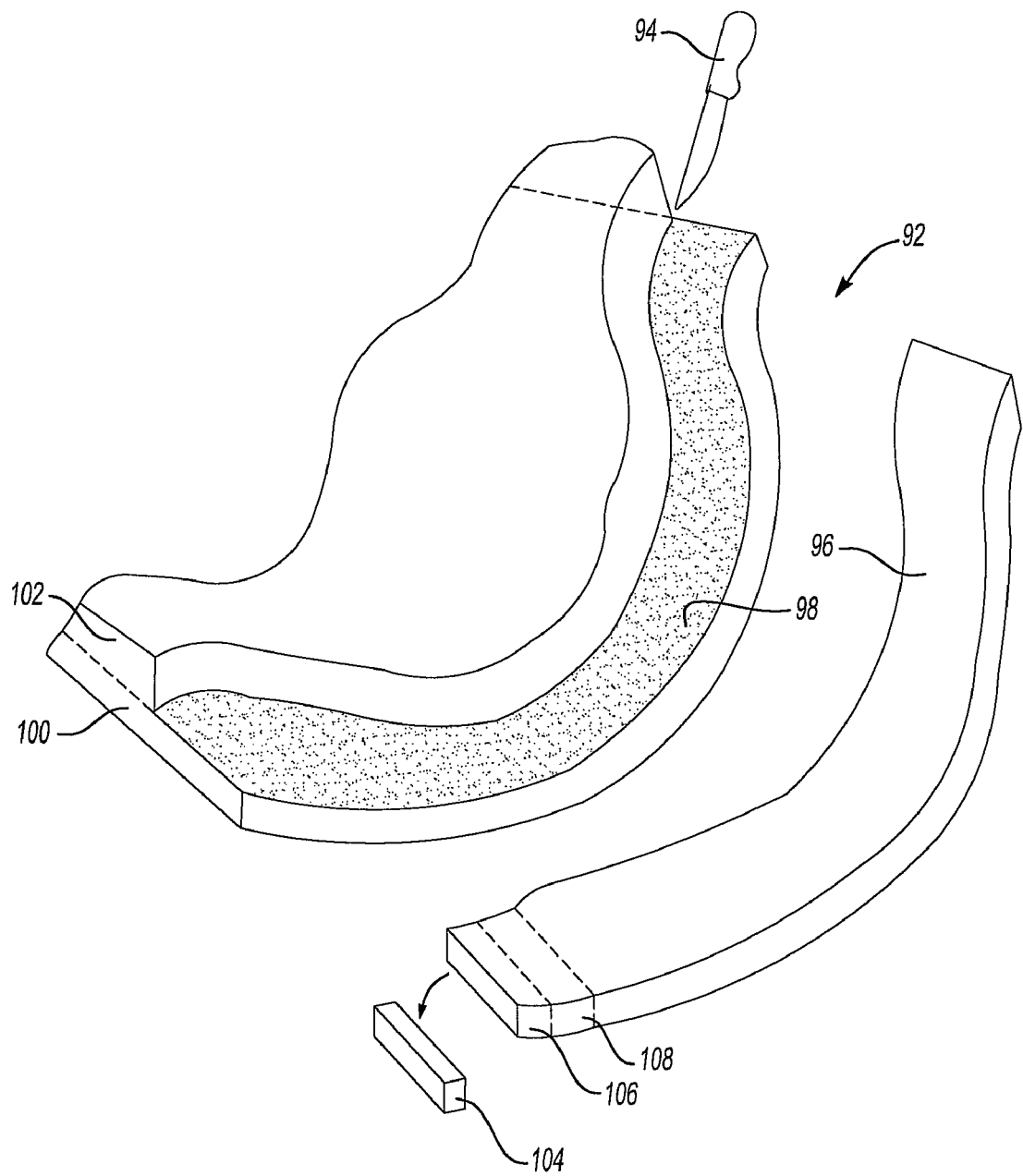
FIG. 9 is an enlarged partial perspective of a knife edge being employed to remove a boundary extending and subset thickness portion of a previously reduced (resized) sheet, and in order to create the desired feathering (transitional layering) effect.

Referring finally to FIG. 9, an enlarged partial perspective is shown at 92 of a knife edge (at 94) being employed to remove a boundary extending and subset thickness portion 96 of a previously reduced (resized) sheet, again in order to create the desired feathering (transitional layering) effect. FIG. 9 is generally similar to the configuration illustrated in FIG. 5, and which better illustrates the feature of the wax release layer 98 revealed by the removal of the outer/upper band of material 96 corresponding to an upper ply of material. It is again understood that a two ply sheet material (as further referenced by plies 100 and 102 in FIG. 9) or a three or more ply sheet material can be provided according to the desires of the user.

FIG. 9 also illustrates the ability to section equal dimensioned (length, width and thickness) shims 104, 106 and 108, such as from the previously excised band 96 of ply material. While this provides one possible application for producing desired shim material, it is also envisioned that the desired shims are separately provided separately (such as each having a desired but non-limiting thickness of 1/16"-1/8") or which are sectioned from an uncut sheet of material, or from an initially excised and outermost fill depth portion of a sheet (see again operation 62 in FIG. 5).

A related method is also disclosed for flattening a depression in a floor surface, and which includes the steps of overlaying a straight edge having an underside across the floor depression, inserting at least one shim between said straight edge and a location along the floor depression, and displacing the individual numbers of shims along the straight edge until coming into contact with both its underside and the floor surface. Additional steps include marking individual contact locations established by one or more shims along the straight edge, successively advancing the straight edge in spaced and incremental fashion along the depression between marking successive pluralities of contact locations, and interconnecting at least one individual plurality of marked locations corresponding to an equal number of shims to establish a perimeter defined boundary. Further steps include providing a sheet exhibiting a specified length, width and thickness and exhibiting at least first and second plies defining subset thicknesses, sectioning an outer perimeter of the sheet to match the perimeter defined boundary, subsequently removing an outermost band of at least one of the plies of material, to define a stepped pattern and applying the resized and feathered edged sheet over the perimeter defined boundary.

Additional method steps include establishing a deepest perimeter defined boundary at a central most located within the depression, with progressively shallower depths defining additional and encircling perimeter boundaries so that a shallow-most depth defines an outermost perimeter boundary of the floor depression, as well as coating the sheet with at least one of a moisture impervious membrane and a mold inhibitor. Other method steps include constructing said sheet from at least one of a thermo-polymer and a vinyl material, applying a wax layer between the plies of sheet material, and applying a tacky layer applied to an exposed surface of at least one of the sheet and shims.

The present inventions also disclose a sheet for flattening a depression in a floor surface, and which includes a body exhibiting a specified length, width and thickness and further having at least first and second plies defining subset thicknesses. A wax, or other suitable multi-ply release layer is interposed between the plies of sheet material. The sheet is secured by either of a plurality of underlayment ring shank nails (not shown) or through the provision of a tacky layer applied to an exposed surface of the sheet and which is covered by a peel away layer. The use of a tacky layer is particularly applicable to a vinyl sheet exhibiting a clean adhering surface to which the tacky layer is pre-applied.

Other sheet article features again include the body exhibiting a specified shape and size and further having a total thickness no greater than 1/4", with a selected ply thickness of between 1/4 and 1/2 of the total thickness. The sheet may also be coated with at least one of a moisture impervious membrane and a mold inhibitor and can also be constructed (in a few of numerous non-limiting applications) of a thermo-polymer or a vinyl material.

Having described my invention, other and additional preferred embodiments will become apparent to those skilled in the art to which it pertains and without deviating from the scope of the appended claims.

I claim:

1. A kit for flattening a depression in a floor surface, comprising:

an elongated article exhibiting a straight edge adapted to overlay the floor depression in each of a plurality of incrementally spaced locations;

at least one shim having a length, width and thickness which is placed between said straight edge and a location along the floor depression;

a marking indicia for identifying locations upon the floor surface in which said at least one shim is in contact with both an underside of said straight edge and the floor surface, said marking indicia interconnecting a plurality of individually marked locations, each of which corresponds to an equal number of shims, and in order to establish a perimeter defined boundary;

a sheet exhibiting a specified length, width and thickness and further comprising at least first and second plies defining subset thicknesses; and an incising tool for re-sizing an outer perimeter of said sheet to match said perimeter defined boundary, said incising tool subsequently removing an outermost band of at least one of said plies of material and in order to define a stepped pattern, prior to said sheet being applied over said perimeter defined boundary.

2. The kit as described in claim 1, said sheet having a specified shape and size and being coated with at least one of a moisture impervious membrane and a mold inhibitor.

3. The kit as described in claim 1, said sheet having a specified shape and size and being constructed of at least one of a thermo-polymer and a vinyl material.

4. The kit as described in claim 1, further comprising a wax layer between said plies of sheet material.

5. The kit as described in claim 1, further comprising at least one of a plurality of underlayment ring shank nails or a tacky layer applied to an exposed surface of at least one of said sheet and shims.

6. The kit as described in claim 1, said sheet exhibiting a specified shape and size and further comprising a total thickness no greater than ¼", with a selected ply thickness of between ¼ and ½ said total thickness.

7. The kit as described in claim 1, said sheet exhibiting a specified shape and size and further comprising first, second and third plies of material.

8. The kit as described in claim 1, at least one of said length and width of said sheet further comprising a dimension of between 42" and 96".

9. The kit as described in claim 1, said elongated article exhibiting an overall length up to 96".

10. The kit as described in claim 1, further comprising a plurality of sheets, each establishing a different perimeter defined boundaries.

11. A method for flattening a depression in a floor surface, comprising the steps of:
    overlaying a straight edge having an underside across the floor depression;
    inserting at least one shim between said straight edge and a location along the floor depression;
    displacing said shims along said straight edge until coming into contact with both said underside and the floor surface;
    marking individual contact locations established by one or more shims along said straight edge;
    advancing said straight edge in spaced and incremental fashion along the depression between marking successive pluralities of contact locations;
    interconnecting at least one individual plurality of marked locations corresponding to an equal number of shims to establish a perimeter defined boundary;
    providing a sheet exhibiting a specified length, width and thickness and exhibiting at least first and second plies defining subset thicknesses;
    sectioning an outer perimeter of said sheet to match said perimeter defined boundary;
    subsequently removing an outermost band of at least one of said plies of material, to define a stepped pattern; and
    applying said sheet over the perimeter defined boundary.

12. The method as described in claim 11, further comprising a deepest perimeter defined boundary being central most located within the depression, progressively shallower depths defining additional and encircling perimeter boundaries so that a shallow-most depth defines an outermost perimeter boundary of the floor depression.

13. The method as described in claim 11, further comprising the step of coating said sheet with at least one of a moisture impervious membrane and a mold inhibitor.

14. The method as described in claim 11, further comprising the step of constructing said sheet from at least one of a thermo-polymer and a vinyl material.

15. The method as described in claim 11, further comprising the step of applying a wax layer between said plies of sheet material.

16. The method as described in claim 11, further comprising the step of applying at least one of a plurality of underlayment ring shank nails or a tacky layer applied to an exposed surface of at least one of said sheet and shims for securing said sheet within said boundary.

* * * * *